United States Patent
Chen

(10) Patent No.: US 10,021,250 B1
(45) Date of Patent: Jul. 10, 2018

(54) LOCATION INFORMATION CONTROL FOR SESSION INITIATION PROTOCOL MESSAGES

(75) Inventor: Bonnie Chen, Grapevine, TX (US)

(73) Assignee: Sprint Communications Company L.P., Overland Park, KS (US)

(*) Notice: Subject to any disclaimer, the term of this patent is extended or adjusted under 35 U.S.C. 154(b) by 241 days.

(21) Appl. No.: 13/460,085

(22) Filed: Apr. 30, 2012

(51) Int. Cl.
*H04M 11/04* (2006.01)

(52) U.S. Cl.
CPC ........ *H04M 11/04* (2013.01); *H04M 2242/04* (2013.01)

(58) Field of Classification Search
CPC ..... H04W 76/007; H04W 64/00; H04W 4/02; H04W 80/04; H04L 2012/5607; G01C 21/26; G01C 21/30; G01C 21/00; B60R 2300/105; G08G 1/205; G01S 1/02
USPC ................ 455/404.1, 456.1–457, 414.1, 0.2; 370/310.2, 328; 701/207, 213, 214, 216, 701/408, 445, 491, 515; 340/988; 342/357.1, 0.06, 0.12, 450, 457
See application file for complete search history.

(56) References Cited

U.S. PATENT DOCUMENTS

| | | | |
|---|---|---|---|
| 6,070,065 A * | 5/2000 | Armbruster et al. ...... 455/404.2 |
| 6,360,102 B1 * | 3/2002 | Havinis et al. ............... 455/457 |
| 6,594,483 B2 * | 7/2003 | Nykanen et al. ............ 455/411 |
| 6,714,790 B2 * | 3/2004 | Heckard et al. ........... 455/456.1 |
| 7,937,067 B2 * | 5/2011 | Maier et al. ............... 455/404.1 |
| 8,401,154 B2 * | 3/2013 | Boni et al. ...................... 379/45 |
| 2007/0060097 A1 * | 3/2007 | Edge et al. ................ 455/404.1 |
| 2007/0298760 A1 * | 12/2007 | Leis et al. .................. 455/404.1 |
| 2008/0261557 A1 | 10/2008 | Sim |
| 2009/0003322 A1 * | 1/2009 | Isumi ............................ 370/352 |
| 2009/0176474 A1 * | 7/2009 | Bajko ........................ 455/404.1 |

* cited by examiner

Primary Examiner — Steve D Agosta

(57) ABSTRACT

In a wireless communication system, a wireless communication device transfers a SIP INVITE message having a first header with a first value indicating a location-handling requirement. The SIP INVITE message also has a second header with a location value. A communication signaling processing system processes the SIP INVITE message to determine a second value responsive to the first value indicating the location-handling requirement. The processing system replaces the location value in the second header of the SIP INVITE message with the second value. The processing system transfers the SIP INVITE message with the second value in the second header.

20 Claims, 8 Drawing Sheets

US 10,021,250 B1

LOCATION INFORMATION CONTROL FOR SESSION INITIATION PROTOCOL MESSAGES

TECHNICAL BACKGROUND

Session Initiation Protocol (SIP) is a communication signaling format that applications use to set-up communication sessions. Many of these communication sessions transfer live audio and/or video, files, and messages between computers, smartphones, and the like. In some cases, wireless communication devices use SIP to establish emergency communication sessions with the appropriate emergency responders.

SIP messages have multiple headers to convey various pieces of information, such as message type, user addressing, call-IDs, hop counts, and the like. One of these headers is the P-Access-Network-Info (P-Net-Info) header that provides information about the access network used by the wireless communication device. In wireless access networks, a SIP-based communication device may indicate its serving base station and access technology in the P-Net-Info header. SIP-based communication devices on the session may use this access network information to optimize the media for the specified wireless access technology.

In some cases, the P-Net-Info header includes a Base Station Identifier (BSID) that represents a course location for the user. The course location can be used to provide location-based services to the user—including emergency services. The location information in the P-Net-Info header may be private, and access networks typically remove the P-Net-Info header from SIP messages before their transfer outside of the network.

On an emergency call from a wireless communication device, the device transfers a SIP INVITE message having a "priority" header with an "emergency" value and a P-Net-Info header with the serving BSID. This emergency INVITE message is received and processed by a complex of Call State Control Functions (CSCFs) in an Internet Protocol (IP) Multimedia core network Subsystem (IMS). A Proxy-CSCF (P-CSCF) will process the emergency INVITE message, and based on the emergency service indicator, the priority header, and other information, the P-CSCF forwards the INVITE message to an Emergency-CSCF (E-CSCF).

The E-CSCF invokes a Location Routing Function (LRF) to verify the BSID in the P-Net-Info header. The LRF communicates with the wireless access network to verify which BSID is currently serving the wireless communication device. If the network-provided BSID differs from the user-provided BSID, then the E-CSCF uses the network-provided BSID for routing since it is typically more accurate due to user device malfunctions, user hacking, and the like. The E-CSCF selects the route for the emergency call based on the network-provided BSID in these scenarios.

In another emergency call example, a wireless communication device transfers a SIP INVITE message having a "priority" header with an "emergency" value, but the INVITE does not have a P-Net-Info header. The emergency INVITE message is processed by P-CSCF which forwards the emergency INVITE message to the E-CSCF. The E-CSCF invokes the Location Routing Function (LRF) to obtain a serving BSID for the wireless communication device. The E-CSCF then selects a route for the emergency call based on the network-provided BSID.

Session Description Protocol (SDP) is used to exchange session information between endpoints in a SIP session. The SDP file with the session data is typically carried in the payloads of the SIP messages. In some cases, a wireless communication device will indicate its current GPS coordinate location in the SDP file carried in a SIP payload. This GPS location may be used by the systems on the session to provide location-based services.

Unfortunately, the use of location data in SIP and SDP messages is inefficient and lacks effective user controls.

Technical Overview

In a wireless communication system, a wireless communication device transfers a SIP INVITE message having a first header with a first value indicating a location-handling requirement. The SIP INVITE message also has a second header with a location value. A communication signaling processing system processes the SIP INVITE message to determine a second value responsive to the first value indicating the location-handling requirement. The signaling processing system replaces the location value in the second header of the SIP INVITE message with the second value. The processing system transfers the SIP INVITE message with the second value in the second header.

DETAILED DESCRIPTION

Figure 1:
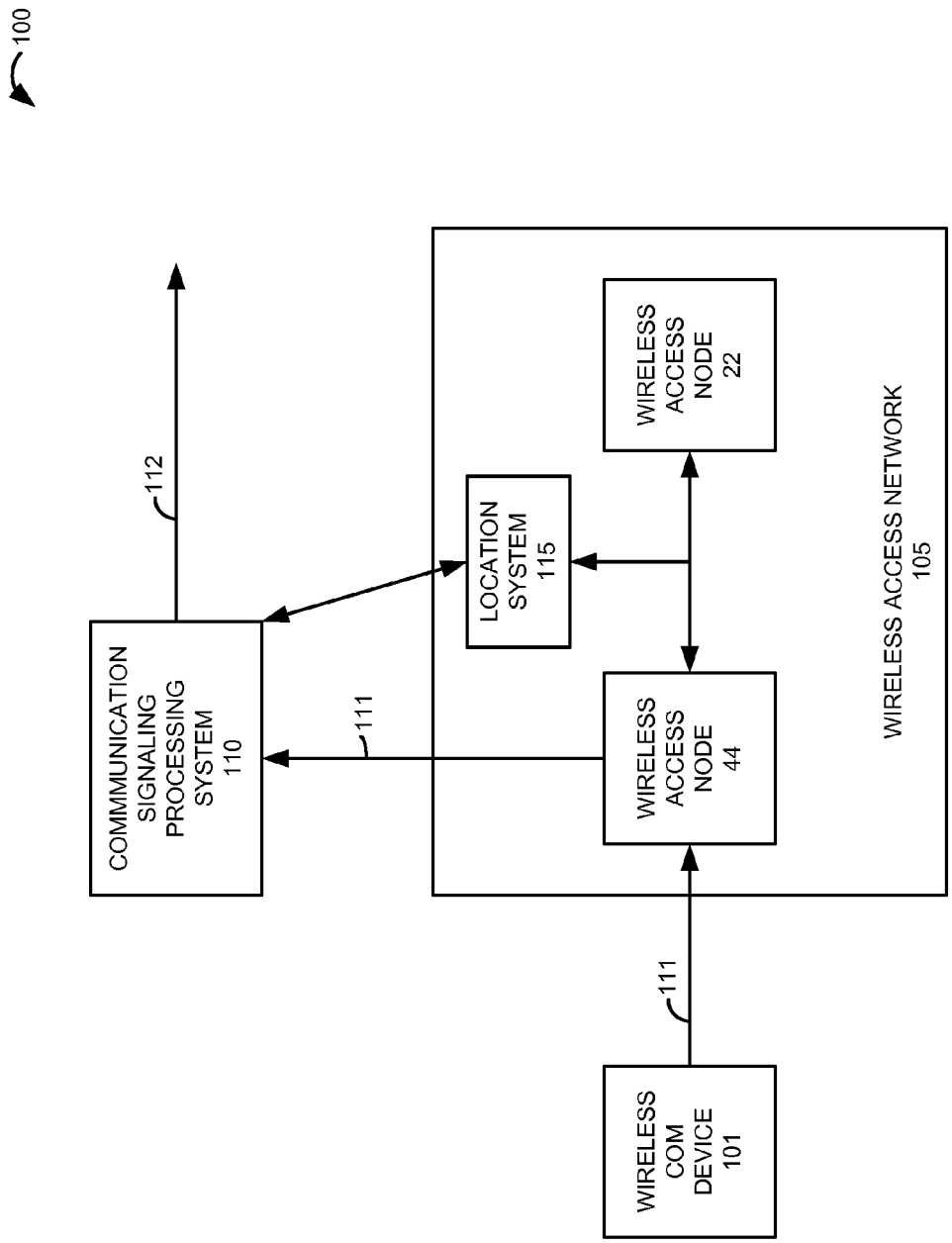
FIG. 1 illustrates a communication system to control location information in SIP messaging.

FIG. 1 illustrates communication system 100 to control location information in SIP messaging. Communication system 100 comprises wireless communication device 101, wireless access network 105, and communication signaling processing system 110. Wireless access network 105 comprises location system 115 and wireless access nodes 22 and 44. Wireless communication device 101 comprises a smartphone, tablet computer, media player, plug-in wireless transceiver, or the like. Although communication signaling processing system 110 is shown externally to wireless access network 105, processing system 110 could be partially or totally integrated within network 105.

Wireless access nodes 22 and 44 comprise base stations, hot-spots, or some other wireless transceiver systems. Wireless communication device 101 and wireless access nodes 22 and 44 exchange data over wireless communication links. The wireless communication links utilize wireless communication protocols, such as Wireless Fidelity (WiFi), Long Term Evolution (LTE), Global System for Mobile Communications (GSM), Evolution Data Only (EVDO), Bluetooth, or some other wireless format.

Communication signaling processing system 110 comprises a computer system including communication interfaces, processing circuitry, memory, software, and data. Likewise, location system 115 also comprises a computer system that includes communication interfaces, processing circuitry, memory, software, and data. For clarity, some conventional components are omitted from FIG. 1, such as routers, servers, call processors, communication links, and the like.

In operation, wireless communication device 101 generates and wirelessly transfers SIP INVITE message 111. SIP INVITE message 111 has a first header with a first value that indicates a location-handling requirement. SIP INVITE message 111 also has a second header with a location value. Wireless access node 44 wirelessly receives SIP INVITE message 111 and forwards it to communication signaling processing system 110—typically through various intermediate links and systems. Communication signaling processing system 110 receives SIP INVITE message 111.

Communication signaling processing system 110 processes the first value in the first header that indicates the location-handling requirement to determine a second value to replace the location value in the second header. Processing system 110 then replaces the location value in the second header of SIP INVITE message 111 with the second value to generate SIP invite message 112. Processing system 110 transfers SIP INVITE message 112 with the second value in the second header.

Various examples of location information control in SIP INVITE messages 111-112 are provided below. In these examples, SIP message 111 is generated by wireless communication device 101, although similar SIP messaging could be generated by another system on behalf of wireless communication device 101. Communication signaling processing system 110 would operate in a similar manner as described herein for SIP messages that are generated by other systems (including wireless access network 105) on behalf of wireless communication device 101. In some examples, wireless communication device 101 may not have GPS functionality but could add the identity of the serving wireless access node and/or sector to SIP INVITE message 111.

Figure 2:
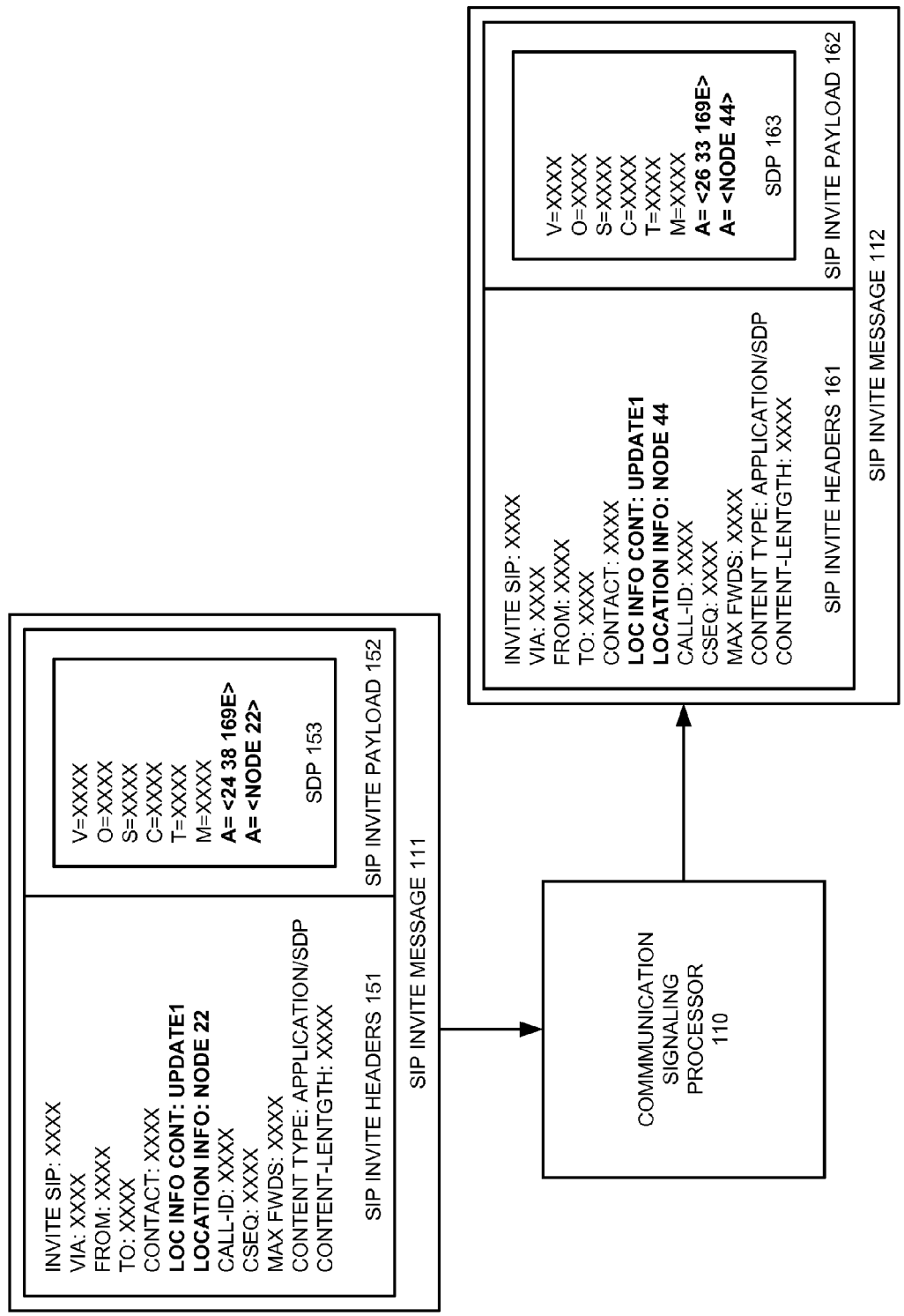
FIG. 2 illustrates the operation of a communication signaling processing system to correct the location information in SIP messages.

FIG. 2 illustrates the operation of communication signaling processing system 110 to correct the location information in SIP messages 111-112. SIP INVITE message 111 comprises SIP INVITE headers 151 and SIP INVITE payload 152. SIP INVITE payload 152 contains SDP file 153. SIP INVITE message 112 comprises SIP INVITE headers 161 and SIP INVITE payload 162. SIP INVITE payload 162 contains SDP file 163. For clarity, the term "XXXX" is used to represent various conventional values in SIP messages 111-112.

SIP headers 151 include a location-info control header with the value of "update1" where "update1" correlates to an instruction to correct, supplement, and maintain location data. SIP headers 151 also include a location information header with the incorrect location value of "NODE 22". In some examples, this location information header comprises a P-Access-Network-Info header. In response to the "update1" value in the location-info control header, processing system 110 updates the location of wireless communication device 101 though location system 115 and discovers that wireless communication device 101 is actually served by access node 44. In response to the "update1" value in the location-info control header, processing system 110 modifies INVITE message 111 to generate INVITE message 112. In particular, processing system 110 replaces the incorrect value of NODE 22 with the correct value of NODE 44 in the location information header of SIP INVITE message 112.

In SIP INVITE message 111, SDP file 153 includes additional location information in the form of attribute values "24 38 169E" and "NODE 22" which respectively represent incorrect GPS coordinates and the incorrect serving base station. In response to the "update1" value in the location-info control header, processing system 110 determines that wireless communication device 101 is actually served by access node 44 and is located at GPS coordinates 26 33 169E. In response to the "update1" value in the location-info control header, processing system 110 also replaces the incorrect attribute values of "24 38 169E" and "NODE 22" with the correct values of "NODE 44" and "26 33 169E" in SDP file 163 of SIP INVITE message 112.

Thus, wireless communication device 101 generates SIP INVITE message 111 to control how signaling processing system 110 handles the location information in SIP INVITE messages 111-112. In this example, wireless device 101 directs processing system 110 to update its location information, and in response, processing system 110 corrects the BSID and GPS coordinates in SIP INVITE message 112.

In some examples, the location-info control header value of "update1" also represents the instruction to maintain the location information during external and/or untrusted transfers. In response to the "update1" value in the location-info control header, processing system 110 will maintain the location information in SIP INVITE message 112—even when transferring SIP message 112 out of wireless access network 105 or over untrusted systems. Thus, processing system 110 will not strip the location information from the location info header in headers 161 or SDP file 163 in SIP INVITE message 112.

Figure 3:
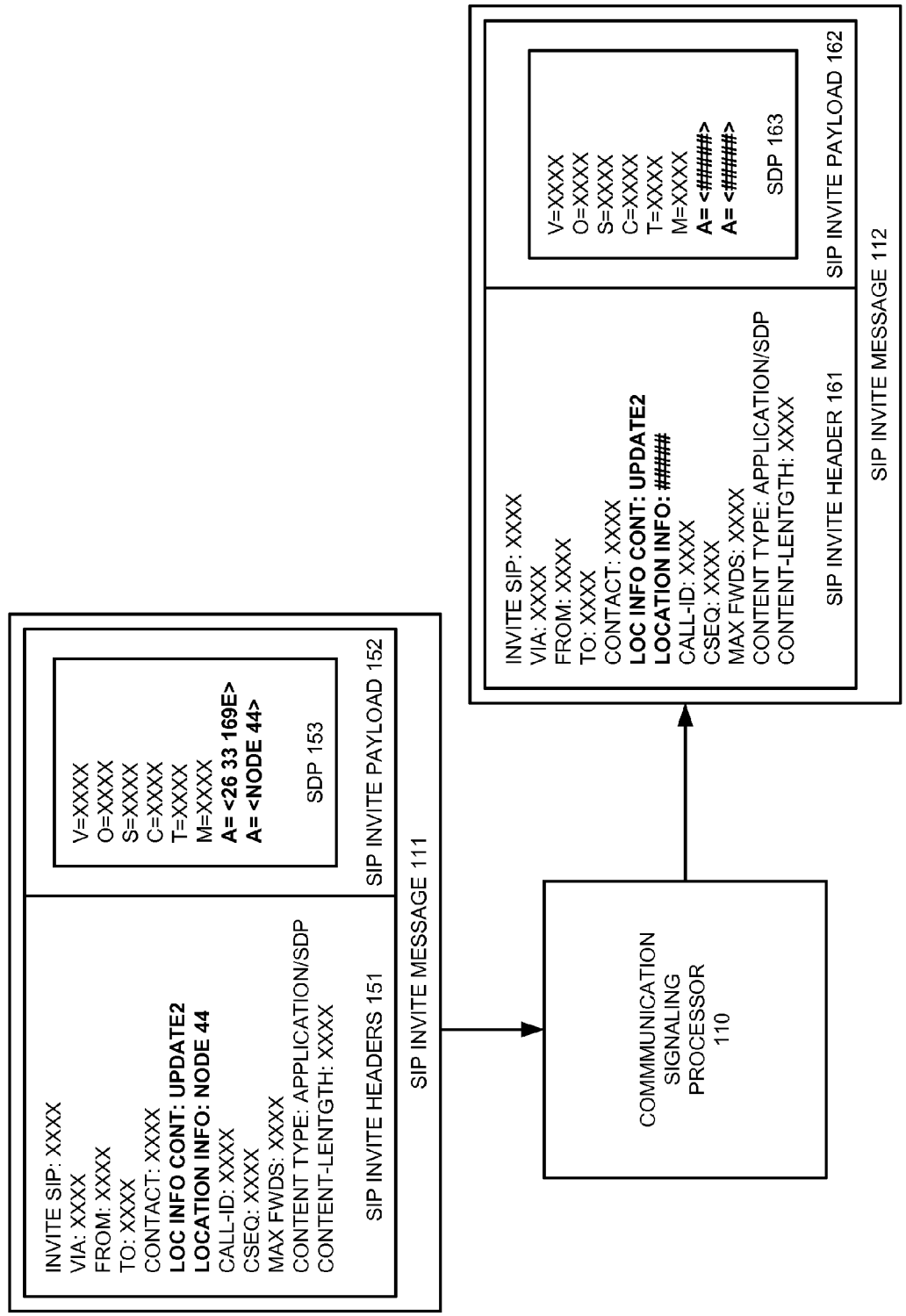
FIG. 3 illustrates the operation of a communication signaling processing system to delete the location information in SIP messages.

FIG. 3 illustrates the operation of communication signaling processing system 110 to delete the location information in SIP messages 111-112. SIP INVITE message 111 comprises SIP INVITE headers 151 and SIP INVITE payload 152. SIP INVITE payload 152 contains SDP file 153. SIP INVITE message 112 comprises SIP INVITE headers 161 and SIP INVITE payload 162. SIP INVITE payload 162 contains SDP file 163. For clarity, the term "XXXX" is used to represent various conventional values in SIP messages 111-112.

SIP headers 151 include a location-info control header with the value of "update2" where "update2" correlates to an instruction to replace location information with dummy (non-location) data "####". In response to the "update2" value in the location-info control header, processing system 110 replaces the location of wireless communication device 101 with the dummy value "####". In particular, processing system 110 removes the correct value of NODE 44 in the location info header and adds the dummy values "####" to the location information header of SIP INVITE 112. In some examples, this location information header comprises a P-Access-Network-Info header.

In SIP INVITE message 111, SDP file 153 includes additional location information in the form of attribute values "26 33 169E" and "NODE 44" which respectively represent the GPS coordinates and the serving base station. In response to the "update2" value in the location-info control header, processing system 110 also removes the correct attribute values of "26 33 169E" and "NODE 44" and adds the dummy values of "####" to SDP file 163 in SIP INVITE message 112.

Thus, wireless communication device 101 generates SIP INVITE message 111 to control how signaling processing system 110 handles location information in SIP INVITE messages 111-112. In this example, wireless device 101 directs processing system 110 to remove its location information, and in response, processing system 110 effectively removes the BSID and GPS coordinates in SIP INVITE message 112. In some examples, communication signaling processing system 110 could delete the location data and the location information headers instead of replacing the data with dummy values.

Figure 4:
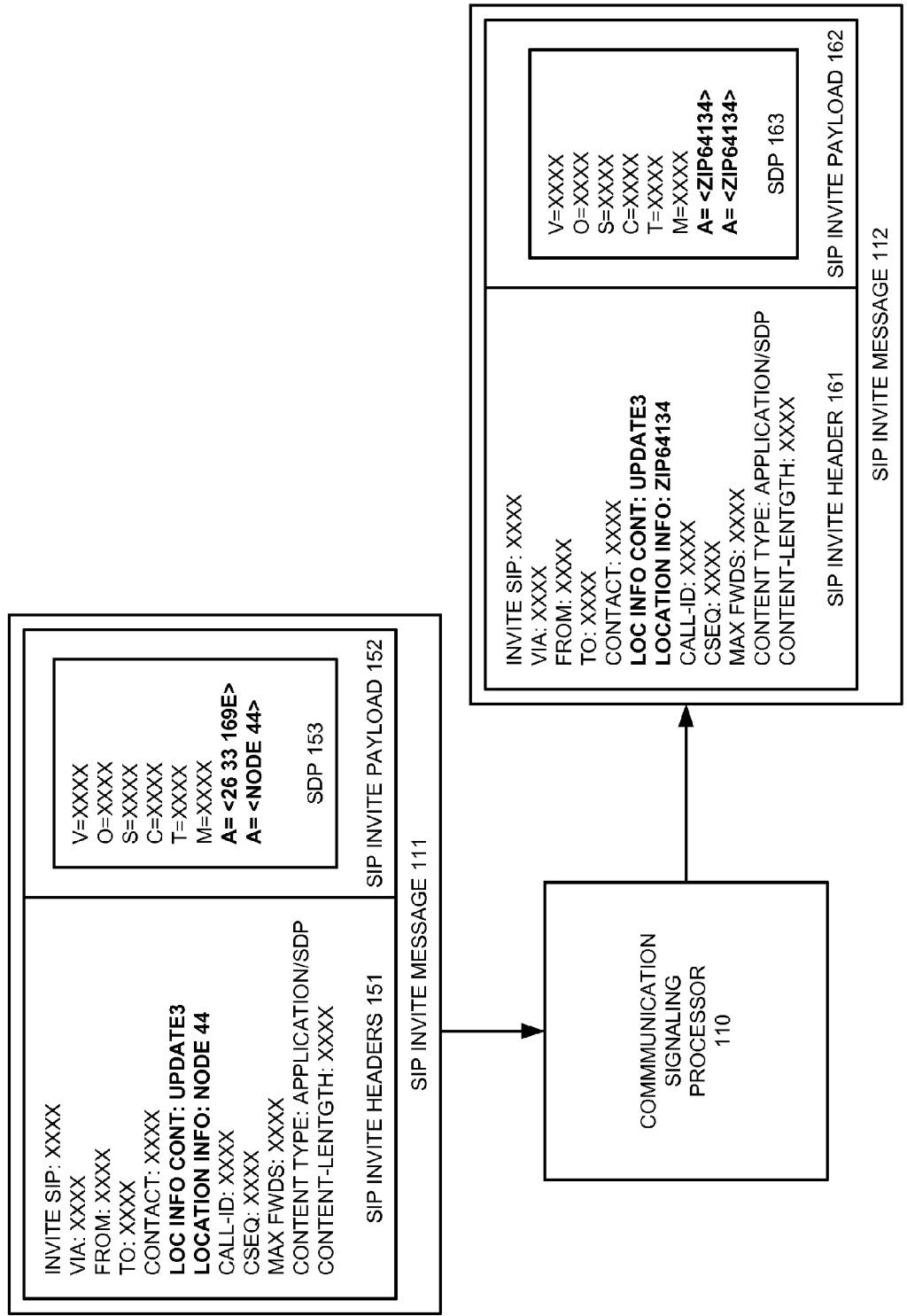
FIG. 4 illustrates the operation of a communication signaling processing system to abstract the location information in SIP messages.

FIG. 4 illustrates the operation of communication signaling processing system 110 to abstract location information in SIP messages 111-112. SIP INVITE message 111 comprises SIP INVITE headers 151 and SIP INVITE payload 152. SIP INVITE payload 152 contains SDP file 153. SIP INVITE message 112 comprises SIP INVITE headers 161 and SIP INVITE payload 162. SIP INVITE payload 162 contains SDP file 163. For clarity, the term "XXXX" is used to represent various conventional values in SIP messages 111-112.

SIP headers 151 include a location-info control header with the value of "update3" where update3 represents an instruction to abstract location data to the zip code level. SIP headers 151 also include a location information header with the correct location value of "NODE 44". In some examples, this location information header comprises a P-Access-Network-Info header. In response to the "update3" value in the location-info control header, processing system 110 abstracts the location of wireless communication device 101 with a corresponding zip code value "ZIP64134"—since Node 44 serves zip code 64134. In particular, processing system 110 removes the correct value of NODE 44 in the location info header and adds the abstracted value "ZIP64134" to the location information header of SIP INVITE 112. Similar abstractions to towns, cities, counties, and states could be used.

In SIP INVITE message 111, SDP file 153 includes additional location information in the form of attribute values "26 33 169E" and "NODE 44" which respectively represent the GPS coordinates and the serving base station. In response to the "update3" value in the location-info control header, processing system 110 also removes the correct attribute values of "26 33 169E" and "NODE 44" and adds the abstracted value of "ZIP64134" to SDP file 163 in SIP INVITE message 112.

Thus, wireless communication device 101 generates SIP INVITE message 111 to control how signaling processing system 110 handles location information in SIP INVITE messages 111-112. In this example, wireless device 101 directs processing system 110 to abstract its location information, and in response, processing system 110 replaces the BSID and GPS coordinates with zip codes in SIP INVITE message 112.

In some other examples, the location-info control header value of "update3" may represent an instruction to increase the resolution of the location information. In response to this version of the "update3" value in the location-info control header, processing system 110 will replace the location information in SIP INVITE message 111 with more accurate location information. For example, processing system 110 may replace "NODE 44" in the location information header with the more precise GPS coordinates "26 33 169E" in SIP INVITE message 112.

Figure 5:
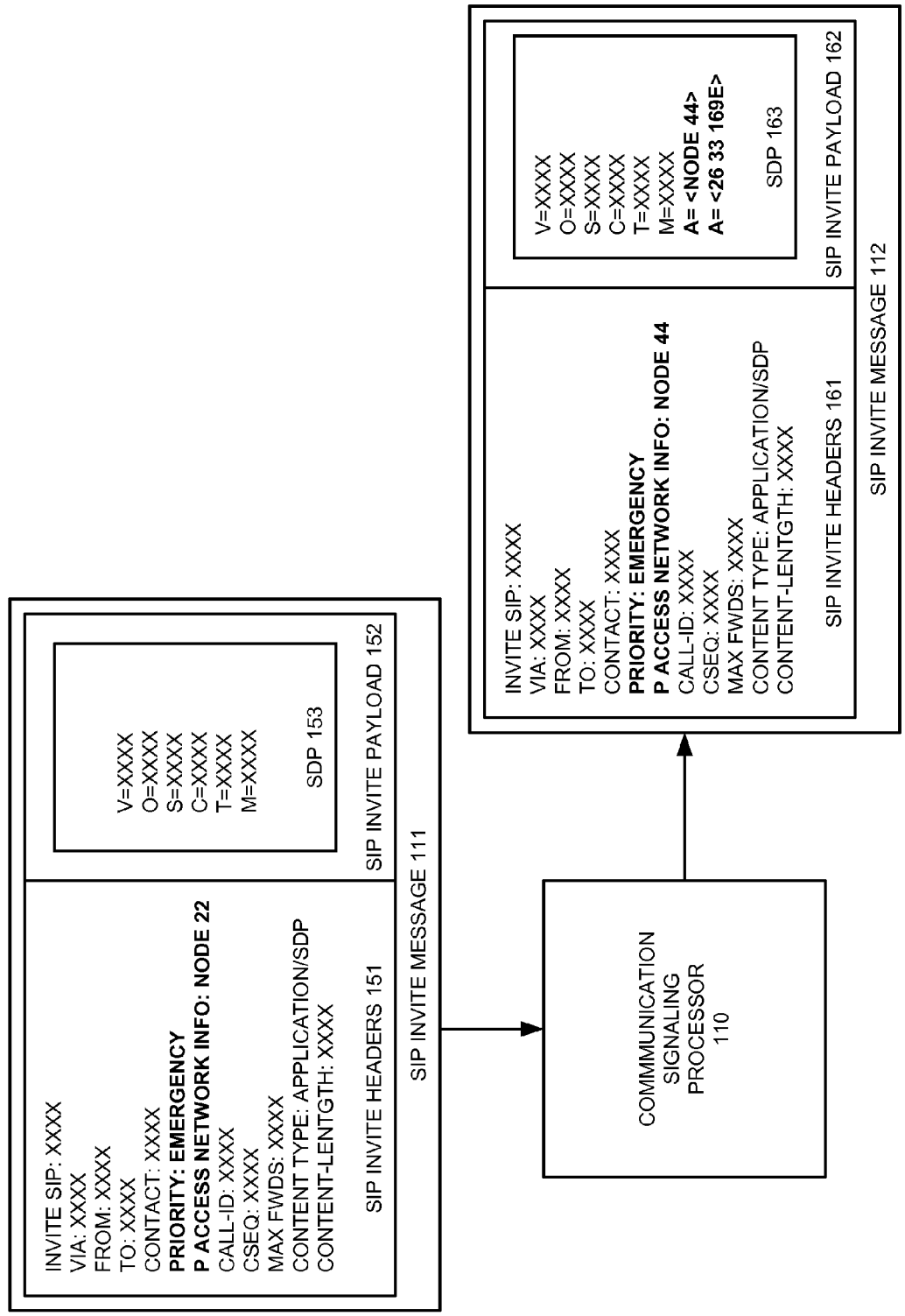
FIG. 5 illustrates the operation of a communication signaling processing system to correct the BSID in the P-Access-Network-Info header of SIP messages.

FIG. 5 illustrates the operation of communication signaling processing system 110 to correct the BSID in the P-Access-Network-Info header of SIP messages 111-112. SIP INVITE message 111 comprises SIP INVITE headers 151 and SIP INVITE payload 152. SIP INVITE payload 152 contains SDP file 153. SIP INVITE message 112 comprises SIP INVITE headers 161 and SIP INVITE payload 162. SIP INVITE payload 162 contains SDP file 163. For clarity, the term "XXXX" is used to represent various conventional values in SIP messages 111-112.

SIP headers 151 include a "PRIORITY" header with a value of "EMERGENCY." In this example, the priority header represents the location-info control header described above, and the emergency value in the priority header represents the update1 value described above. SIP headers 151 include the P-Access-Network-Info header with the incorrect location value of "NODE 22". In response to the "EMERGENCY" value in the priority header, processing system 110 updates the location of wireless communication device 101 by using location system 115 to determine that wireless communication device 101 is actually served by access node 44. In response to the "EMERGENCY" value in the priority header, processing system 110 modifies INVITE message 111 to generate INVITE message 112. In particular, processing system 110 replaces the incorrect value of NODE 22 with the correct value of NODE 44 in the P-Access-Network-Info header of SIP INVITE 112.

In SIP INVITE message 111, SDP file 153 does not include location information. In response to the "EMERGENCY" value in the priority header, processing system 110 determines that wireless communication device 101 is actually served by access node 44 and is located at GPS coordinates 26 33 169E. In response to the "EMERGENCY" value in the priority header, processing system 110 also adds the correct attribute values of "26 33 169E" and "NODE 44" to SDP file 163 in SIP INVITE message 112.

Thus, wireless communication device 101 generates SIP INVITE message 111 to control how signaling processing system 110 handles location information in SIP INVITE messages 111-112. In this example, wireless device 101 directs processing system 110 to update and supplement its location information, and in response, processing system 110 corrects and adds the BSID and GPS coordinates to SIP INVITE message 112.

In some of the examples of FIG. 5, communication signaling processing system 110 comprises an IMS with a P-CSCF, E-CSCF, LRF, and other IMS components. In these examples, the P-CSCF processes SIP INVITE 111 as described herein to provide a corrected and supplemented SIP INVITE 112 to the E-CSCF for emergency call routing with more accurate and precise location information. In particular, the P-CSCF invokes the LRF to validate and obtain location data from location system 115 in wireless access network 105.

Figure 6:
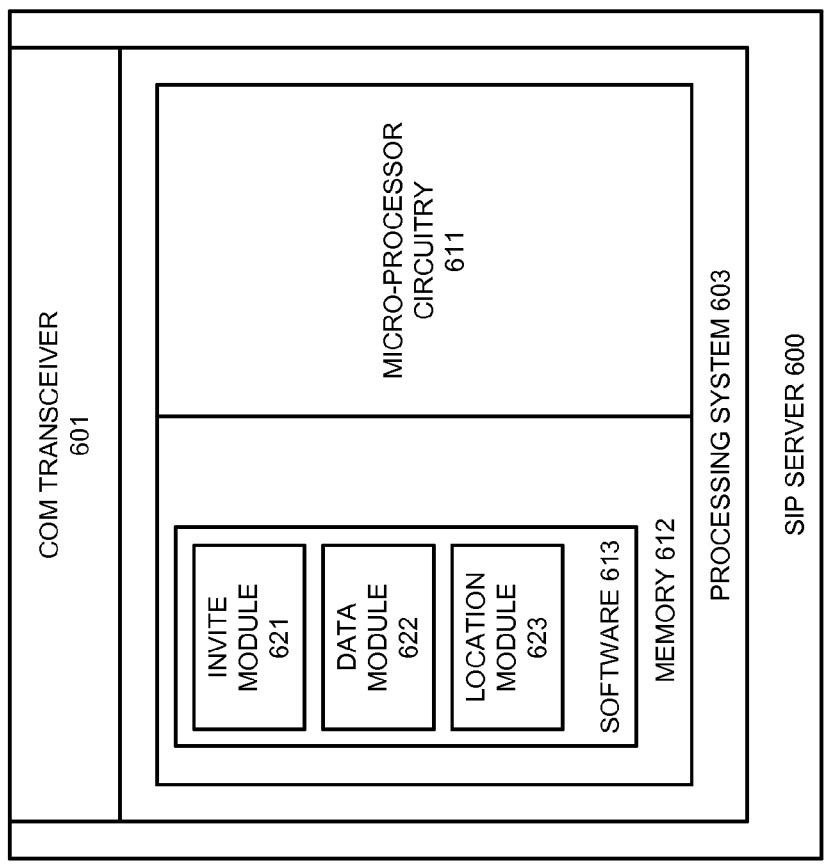
FIG. 6 illustrates a SIP Server to control location information in SIP messaging.

FIG. 6 illustrates SIP server 600 to control location information in SIP messaging. SIP server 600 is an example of the communication signaling processing system 110 on FIGS. 1-5, although processing system 110 may use alternative configurations. SIP server 600 comprises communication transceiver 601 and processing system 603. Processing system 603 comprises micro-processing circuitry 611 and memory 612. Memory 612 stores software 613. SIP server 600 and its components may be integrated onto a single platform or may be distributed across multiple diverse computer systems. Some conventional aspects of SIP server 600 are omitted for clarity, such as power supplies, enclosures, and the like.

Communication transceiver 601 comprises communication components, such as ports, circuitry, memory, software, and links. Communication transceiver 601 exchanges SIP messages and location information messages using the Internet Protocol (IP)—typically in a stack of additional communication protocols.

Micro-processor circuitry 611 comprises circuit boards that hold integrated circuitry and associated electronics. Memory 612 comprises non-transitory, computer-readable, data storage media, such as a flash drive, disc drive, and the like. Software 613 comprises computer-readable instructions that control the operation of micro-processor circuitry 611 when executed. Software 613 includes modules 621-623 and may also include operating systems, applications, utilities, databases, and the like.

When executed by circuitry 611, INVITE module 621 directs circuitry 611 to drive transceiver 601 to exchange SIP INVITE messages with external systems. When executed by circuitry 611, data module 622 directs circuitry 611 to process location-info control headers in SIP INVITE messages to implement any location-info handling requests. Data module 622 maintains translation logic and data to translate the location-handling values from the location-info control headers into actionable location data processes, such as correction, deletion, abstraction, added precision, augmentation, and protection as described herein. Data module 622 also directs circuitry 611 to add any corrected, dummy, or supplemental location information to the SIP INVITE messages. When executed by circuitry 611, location module 623 directs circuitry 611 to drive transceiver 601 to exchange location messaging with location systems to obtain location data for wireless user devices.

Figure 7:
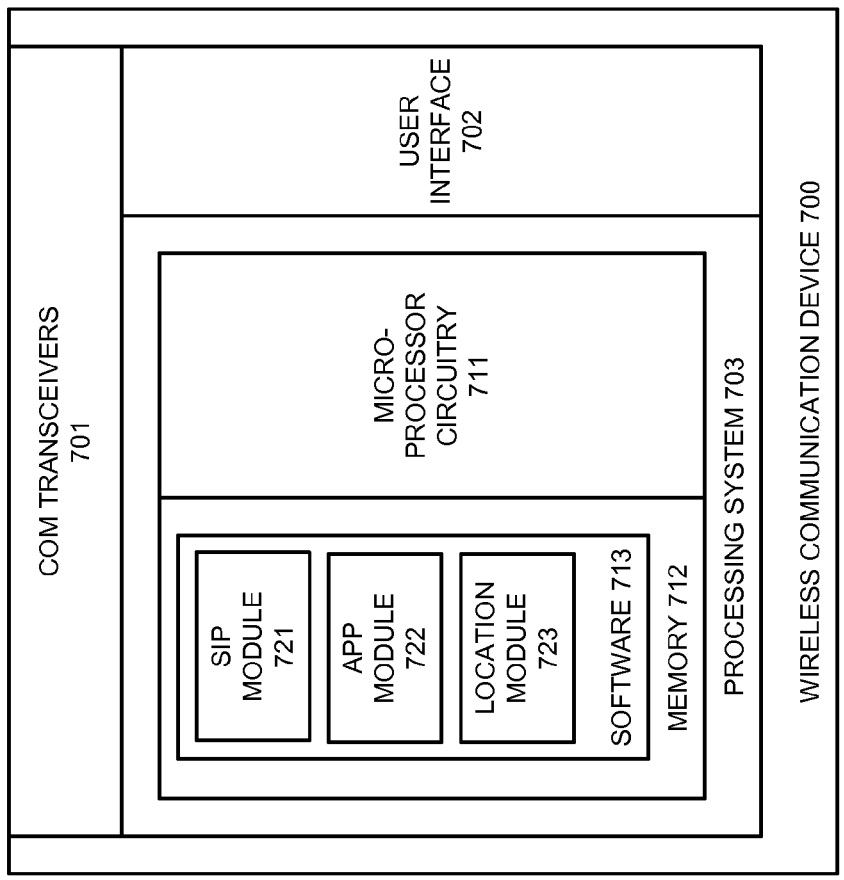
FIG. 7 illustrates a wireless communication device to control location information in SIP messaging.

FIG. 7 illustrates wireless communication device 700 to control location information in SIP messaging. Wireless communication device 700 is an example of device 101 on FIG. 1, although wireless device 101 may use alternative configurations. Wireless communication device 700 comprises communication transceivers 701, user interface 702, and processing system 703. Processing system 703 comprises micro-processing circuitry 711 and memory 712. Memory 712 stores software 713. Some conventional aspects of wireless communication device 700 are omitted for clarity, such as power supplies, enclosures, and the like.

Communication transceivers 701 comprise communication components, such as ports, circuitry, memory, software, and links. For wireless radio communications, the components may include antennas, amplifiers, filters, modulators, signal processors, and the like. In some examples, the radio communications include multiple transceiver sub-systems for near-field, local network, and wide-area network data communications. Communication transceivers 701 exchange SIP messages with wireless networks (and possibly over wired networks as well).

User interface 702 includes components to interact with a human operator, such as a touch display, speaker, microphone, camera, buttons, and switches. User interface 702 may be simplified or omitted in some examples.

Micro-processor circuitry 711 comprises a circuit board that holds integrated circuit chips and associated electronics. Memory 712 comprises non-transitory data storage media, such as a flash drive, disc drive, and the like. Software 713 comprises computer-readable instructions that control the operation of micro-processor circuitry 711 when executed. Software 713 includes modules 721-723 and may also include operating systems, applications, utilities, databases, and the like.

When executed by circuitry 711, SIP module 721 directs circuitry 711 to drive transceivers 701 to exchange SIP messages to establish data transfer sessions. In particular, SIP module 721 directs circuitry 711 to add location-info control headers to SIP messages as directed by application module 722 (or by module 721 logic). When executed by circuitry 711, application module 722 directs circuitry 711 to provide some application to the user, such as telephony, video conferencing, media download, file transfers, and the like. In some cases, application module 722 directs SIP module 721 to add location-info control headers to SIP messages as described herein. When executed by circuitry 711, location module 723 directs circuitry 711 to drive transceivers 701 to determine location information for device 700, such as BSIDs, GPS coordinates, and the like.

Figure 8:
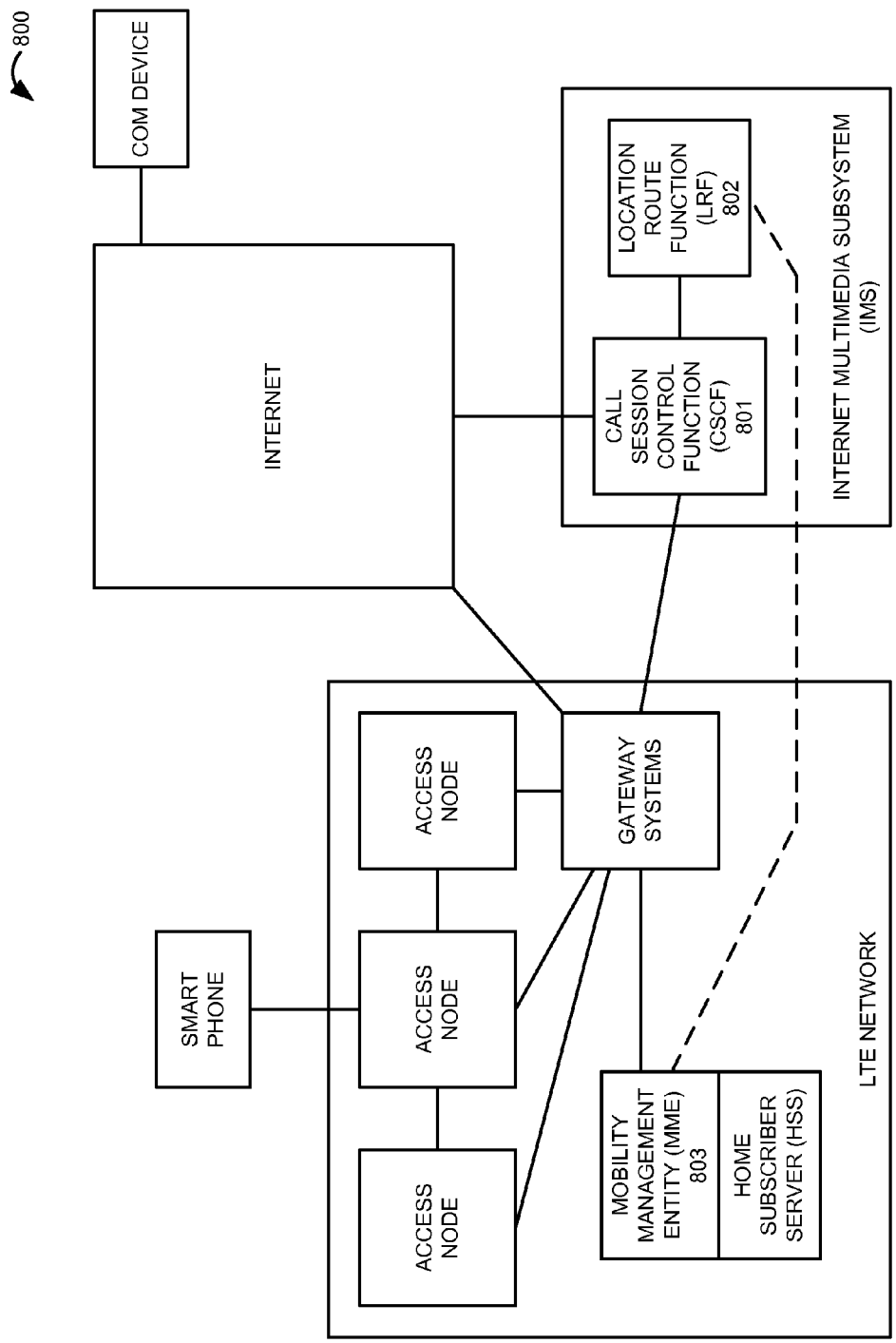
FIG. 8 illustrates an LTE/IMS communication system to control location information in SIP messaging.

FIG. 8 illustrates LTE/IMS communication system 800 to control location information in SIP messaging. Note that various conventional aspects of communication system 800 are omitted for clarity. In LTE/IMS communication system 800, a smartphone uses various wireless access nodes in an LTE network to connect to the Internet. Mobility Management Entity (MME) 803 and its associated Home Subscriber Server (HSS) in the LTE network track the location of the smart phone including the ID of the serving access node and possibly GPS coordinates provided by the smartphone or determined through radio triangulation. MME 803 provides this location information for the smartphone to Location Routing Function (LRF) 802 in the Internet Protocol (IP) Multimedia core network Subsystem (IMS).

On an emergency message, voice call, or video call, the smartphone adds a location-info control header to its SIP INVITE message to correct, supplement, and maintain its location data in the SIP INVITE message. The emergency SIP INVITE may also include a priority emergency header and P-Access-Network-Info header identifying a serving access node. The gateway systems transfer the emergency SIP INVITE to Call State Control Function 801 in the IMS.

In response to the location-info control header, CSCF 801 invokes LRF 802 provide updated location information for the smartphone, and LRF 802 obtains the current location information for the smartphone from MME 803 (or the HSS). CSCF 801 augments the SIP INVITE message with the location information as described for FIG. 2. CSCF 801 then selects a Public Safety Answering Pont (PSAP) to handle the emergency call based on the augmented location information. CSCF 801 forwards the SIP INVITE message with the augmented location for the smartphone to the selected PSAP. In some examples, a P-CSCF invokes LRF 802 and augments the SIP INVITE message for the E-CSCF which then selects the appropriate PSAP.

On a non-emergency video call, the smartphone adds a location-info control header to its SIP INVITE message to abstract and maintain its location data in the SIP INVITE message to provide far-end systems with rough geographic information at a city/town/county level. The gateway systems transfer the SIP INVITE to Call State Control Function 801 in the IMS.

In response to the location-info control header, CSCF 801 translates the location information from the INVITE message (or LRF 802) into the corresponding city, town, or county that geographically includes the serving access node or the device GPS coordinates. CSCF 801 replaces the location information in the SIP INVITE with abstracted location data as described for FIG. 4. CSCF 801 then transfers the abstracted SIP INVITE message over the Internet to a selected SIP destination. Note that CSCF 801 does not strip the abstracted location data from the SIP INVITE message before transfer over the untrusted Internet.

On a non-emergency voice call, the smartphone adds a location-info control header to its SIP INVITE message to delete its location data in the SIP INVITE message. The gateway systems transfer the SIP INVITE to Call State Control Function 801 in the IMS. In response to the location-info control header, CSCF 801 deletes location information from the INVITE message.

The smartphone may provide a user interface allowing the user to select how location information should be used on various SIP sessions. Different location information control could be implemented in different scenarios. Thus, the location information control could be specified by the user on a per call type, per called number, per application type, or other basis. Likewise, applications and operating systems may be configured to specify location information control requirements on a per session basis.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication signaling processing system to handle Session Initiation Protocol (SIP) messaging, the method comprising:
   receiving a SIP INVITE message from a wireless communication device having a location information control value and a location value;
   determining whether the location information control value indicates a first instruction value to correct the location value for the wireless communication device or a second instruction value to dummy the location value for the wireless communication device;
   if the location information control value indicates the first instruction value to correct the location value for the wireless communication device, determining an abstracted-location value for the SIP INVITE message based on a current wireless access node servicing the wireless communication device, in the SIP INVITE message, replacing the location value with the abstracted-location value, and transferring the SIP INVITE message with the abstracted-location value to a SIP destination; and
   if the location information control value indicates the second instruction value to dummy the location value for the wireless communication device, determining a dummy location value for the SIP INVITE message, wherein the dummy location value comprises a value unrelated to a location of the wireless communication device, in the SIP INVITE message, replacing the location value with the dummy location value, and transferring the SIP INVITE message with the dummy location value to a SIP destination.

2. The method of claim 1 further comprising, if the location information control value indicates the first instruction value to correct the location value for the wireless communication device, removing additional location data from a Session Description Protocol (SDP) file of the SIP INVITE.

3. The method of claim 1 further comprising, if the location information control value indicates the first instruction value to correct the location value for the wireless communication device, adding additional location data to a Session Description Protocol (SDP) file of the SIP INVITE.

4. The method of claim 1 wherein the current wireless access node servicing the wireless communication device.

5. The method of claim 1 wherein the communication signaling processing system comprises an IP Multimedia Subsystem (IMS) server.

6. The method of claim 1 wherein the communication signaling processing system comprises a Call Session Control Function (CSCF) server.

7. The method of claim 1 wherein the dummy location value comprises non-location data for the wireless communication device.

8. The method of claim 1 wherein the location information control value is located in a location-info control header in the SIP INVITE message.

9. The method of claim 1 wherein the location information control value is located in a P-Access-Network-Info header.

10. The method of claim 1 wherein the location value comprises an identifier for a wireless access node that is different than the current wireless access node.

11. A wireless communication system to handle Session Initiation Protocol (SIP) messaging comprising:
    a wireless communication device configured to generate and transfer a SIP INVITE message having a location information control value and a location value;
    a communication signaling processing system configured to receive the SIP INVITE message from a wireless communication device, determine whether the location information control value indicates a first instruction value to correct the location value for the wireless communication device or a second instruction value to dummy the location value for the wireless communication device;
    the communication signaling processing system configured to, if the location information control value indicates the first instruction value to correct the location value for the wireless communication device, determine an abstracted-location value for the SIP INVITE message based on a current wireless access node servicing the wireless communication device, in the SIP INVITE message, replace the location value with the abstracted-location value, and transfer the SIP INVITE message with the abstracted-location value to a SIP destination; and
    the communication signaling processing system configured to, if the location information control value indicates the second instruction value to dummy the location value for the wireless communication device, determine a dummy location value for the SIP INVITE message, wherein the dummy location value comprises a value unrelated to a location of the wireless communication device, in the SIP INVITE message, replace the location value with the dummy location value, and transfer the SIP INVITE message with the dummy location value to a SIP destination.

12. The wireless communication system of claim 11 wherein the communication signaling processing system is further configured to, if the location information control value indicates the first instruction value to correct the location value for the wireless communication device, remove additional location data from a Session Description Protocol (SDP) file of the SIP INVITE.

13. The wireless communication system of claim 11 wherein the communication signaling processing system is further configured to, if the location information control value indicates the first instruction value to correct the location value for the wireless communication device, add additional location data to a Session Description Protocol (SDP) file of the SIP INVITE.

14. The wireless communication system of claim 11 wherein the abstracted-location value comprises a zip code corresponding to the current wireless access node servicing the wireless communication device.

15. The wireless communication system of claim 11 wherein the communication signaling processing system comprises an IP Multimedia Subsystem (IMS) server.

16. The wireless communication system of claim 11 wherein the communication signaling processing system comprises a Call Session Control Function (CSCF) server.

17. The wireless communication system of claim 11 wherein the dummy location value comprises non-location data for the wireless communication device.

18. The wireless communication system of claim 11 wherein the location information control value is located in a location-info control header in the SIP INVITE message.

19. The wireless communication system of claim 11 wherein the location information control value is located in a P-Access-Network-Info header.

20. The wireless communication system of claim 11 wherein the location value comprises an identifier for a wireless access node that is different than the current wireless access node.

* * * * *